US012572598B1

(12) United States Patent
Liu et al.

(10) Patent No.: US 12,572,598 B1
(45) Date of Patent: Mar. 10, 2026

(54) AUTOMATED GENERATION OF VALID, COMPUTATIONALLY EXPLOSIVE CAUSAL GRAPH DATA STRUCTURES

(71) Applicant: Intuit Inc., Mountain View, CA (US)

(72) Inventors: Chuanren Liu, San Diego, CA (US); Renee Dai, San Diego, CA (US); Benjamin Sandler Farber, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 10 days.

(21) Appl. No.: 19/285,814

(22) Filed: Jul. 30, 2025

(51) Int. Cl.
*G06F 16/901* (2019.01)
*G06F 16/9032* (2019.01)

(52) U.S. Cl.
CPC .... *G06F 16/9024* (2019.01); *G06F 16/90332* (2019.01)

(58) Field of Classification Search
CPC ...................... G06F 16/9024; G06F 16/90332
USPC ....................................................... 707/760
See application file for complete search history.

(56) References Cited

U.S. PATENT DOCUMENTS

| | | | | |
|---|---|---|---|---|
| 12,190,416 | B1 * | 1/2025 | Papancea | G06T 11/206 |
| 2022/0035800 | A1 * | 2/2022 | Dym | G06F 9/505 |
| 2025/0259144 | A1 * | 8/2025 | Crabtree | G06Q 30/0601 |

OTHER PUBLICATIONS

Xia, K., et al., "The Causal-Neural Connection: Expressiveness, Learnability, and Inference", Oct. 3, 2022, 54 pages.
Zanga, A., et al., "A Survey on Causal Discovery: Theory and Practice", May 17, 2023, 47 pages.
Antonucci, A., et al., "Zero-Shot Causal Graph Extrapolation from Text via LLMs", Dec. 22, 2023, 5 pages.
Kyono, T., et al., "Castle: Regularization via Auxiliary Causal Graph Discovery", Jan. 1, 2020, 12 pages.

* cited by examiner

*Primary Examiner* — Kimberly L Wilson
(74) *Attorney, Agent, or Firm* — Lathrop GPM LLP

(57) ABSTRACT

A method of enhancing a computational efficiency of a computer. The method includes iterating, until convergence, a number of steps including receiving a prompt, executing a language model on the prompt to output a directed graph data structure, executing a statistical test on the directed graph data structure to identify an error, identifying that the directed graph data structure fails to outperform a threshold number of predetermined additional directed graph data structures generated from the variables, generating, based on the error, a natural language constraint, adding the natural language constraint to the prompt, executing the language model on the modified prompt to output an updated directed graph data structure. A final graph data structure is returned when the updated directed graph data structure outperforms the threshold number of the number of predetermined additional directed graph data structures.

20 Claims, 5 Drawing Sheets

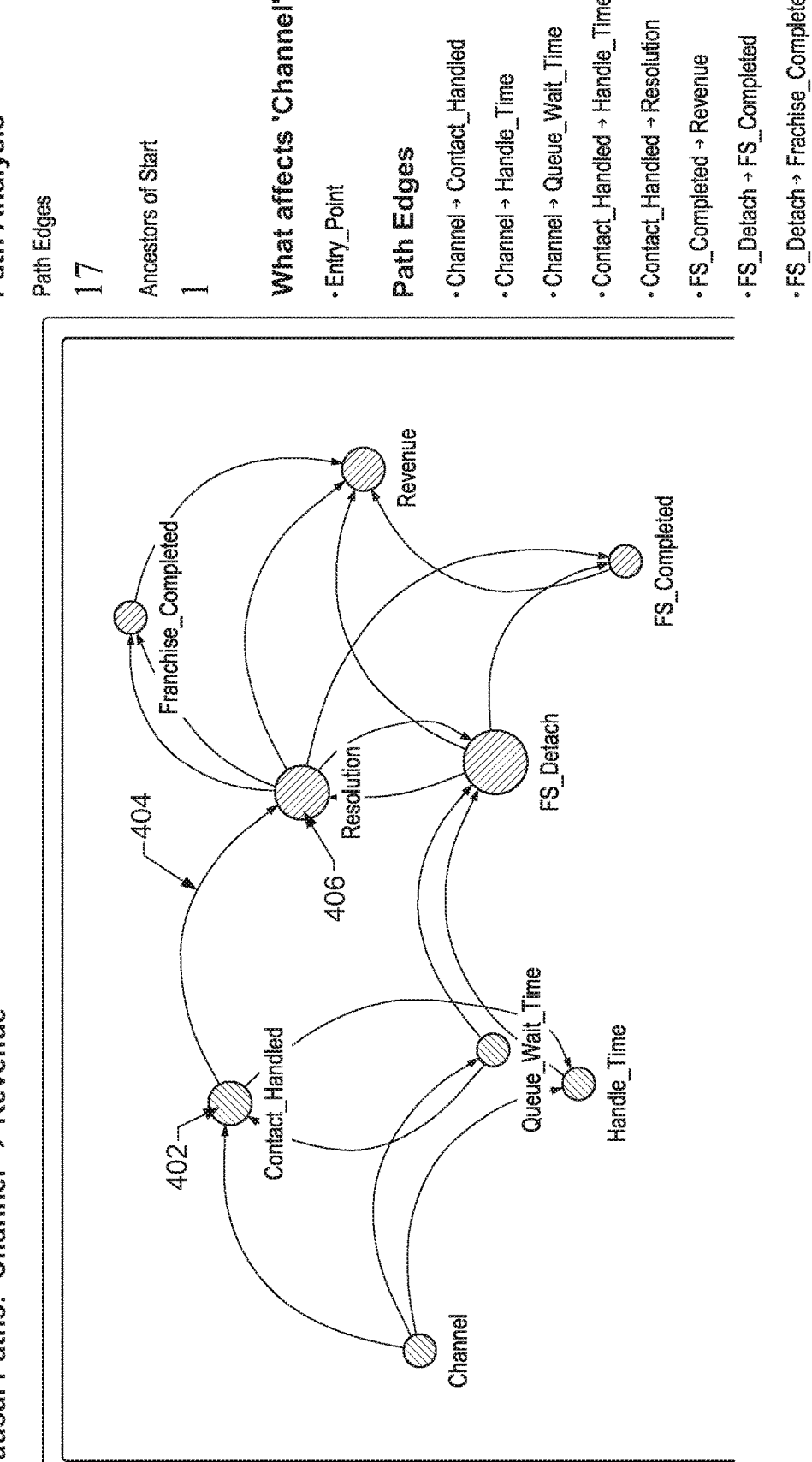

Causal Paths: 'Channel' → 'Revenue'

400

402
404
406

Channel
Contact_Handled
Queue_Wait_Time
Handle_Time
Resolution
Franchise_Completed
Revenue
FS_Detach
FS_Completed

Path Analysis

Path Edges

17

Ancestors of Start

1

What affects 'Channel'

• Entry_Point

Path Edges

• Channel → Contact_Handled
• Channel → Handle_Time
• Channel → Queue_Wait_Time
• Contact_Handled → Handle_Time
• Contact_Handled → Resolution
• FS_Completed → Revenue
• FS_Detach → FS_Completed
• FS_Detach → Frachise_Completed
• FS_Detach → Revenue

*FIG. 4*

AUTOMATED GENERATION OF VALID, COMPUTATIONALLY EXPLOSIVE CAUSAL GRAPH DATA STRUCTURES

BACKGROUND

Some computing tasks become difficult due to the volume of computations desired for a particular algorithm. The number of computations may become so large that even a group of modern computers lack sufficient computing resources to perform the desired algorithm within a desired amount of time.

SUMMARY

One or more embodiments provide for a method of enhancing a computational efficiency of a computer. The method includes iterating, until convergence, a number of steps. The steps include receiving a prompt including a natural language description of a number of variables. The number of variables are sufficiently numerous that generation of a final directed graph data structure from the number of variables is computationally explosive. The steps also include executing a language model on the prompt to output a directed graph data structure. The steps also include executing a statistical test on the directed graph data structure to identify an error in the directed graph data structure. The steps also include identifying, based on the error, that the directed graph data structure fails to outperform a threshold number of a number of predetermined additional directed graph data structures generated from the number of variables. The steps also include generating, based on the error, a natural language constraint. The steps also include generating a modified prompt by adding the natural language constraint to the prompt. The steps also include executing the language model on the modified prompt to output an updated directed graph data structure. The method also includes determining that convergence occurs when the updated directed graph data structure outperforms the threshold number of the number of predetermined additional directed graph data structures. The method also includes returning the final directed graph data structure. the final directed graph data structure includes the updated directed graph data structure at a last step of the steps.

One or more embodiments provide for a system for enhancing a computational efficiency of a computer. The system includes a computer processor and a data repository in communication with the computer processor. The data repository stores a prompt including a natural language description of a number of variables. The number of variables are sufficiently numerous that generation of a final directed graph data structure from the number of variables is computationally explosive. The data repository also stores a directed graph data structure. The data repository also stores an error in the directed graph data structure. The data repository also stores a number of predetermined additional directed graph data structures. The data repository also stores a threshold number, a natural language constraint, and a modified prompt. The data repository also stores an updated directed graph data structure, including the final directed graph data structure. The system also includes a language model including a neural network executable by the processor to receive the prompt, output the directed graph data structure, receive the updated prompt, and output the updated directed graph data structure. The system also includes a statistical test executable by the processor to identify the error in the directed graph data structure. The system also includes a server controller executable by the processor to iterate, until convergence, a number of steps. The steps include receiving the prompt. The steps also include executing the language model on the prompt to output the directed graph data structure. The steps also include executing the statistical test on the directed graph data structure to identify the error. The steps also include identifying, based on the error, that the directed graph data structure fails to outperform the threshold number of the number of predetermined additional directed graph data structures. The steps also include generating, based on the error, the natural language constraint. The steps also include generating the modified prompt by adding the natural language constraint to the prompt. The steps also include executing the language model on the modified prompt to output the updated directed graph data structure. The server controller is further executable by the processor to determine that convergence occurs when the updated directed graph data structure outperforms the threshold number of the number of predetermined additional directed graph data structures. The server controller is further executable by the processor to returning the final directed graph data structure. The final directed graph data structure includes the updated directed graph data structure at a last step of the number of steps.

One or more embodiments provide for another method for enhancing a computational efficiency of a computer. The method includes iterating, until convergence, a number of steps. The steps include receiving a prompt including a natural language description of a number of variables. The number of variables are sufficiently numerous that generation of a final directed graph data structure from the number of variables is computationally explosive. The steps also include executing a language model on the prompt to output a directed graph data structure. The steps also include executing a falsifiability test on the directed graph data structure to determine whether the directed graph data structure passes a baseline rule. The steps also include executing, responsive to the falsifiability test passing the baseline rule, a statistical test on the directed graph data structure to identify an error in the directed graph data structure. The steps also include identifying, based on the error, that the directed graph data structure fails to outperform a threshold number of a number of predetermined additional directed graph data structures generated from the number of variables. Identifying includes comparing the error in the directed graph data structure to a number of sets of errors present in the predetermined additional directed graph data structures. Each one of the number of sets of errors corresponds to one of the predetermined additional directed graph data structures. Identifying also includes determining that the directed graph data structure outperforms a selected predetermined additional directed graph data structure in the predetermined additional directed graph data structures when the error includes fewer errors than a selected set of errors in a corresponding one of the number of sets of errors. The steps also include generating, based on the error, a natural language constraint. The natural language constraint includes at least one of an instruction to avoid a causal relationship in the directed graph data structure that failed the statistical test, an instruction to reject the directed graph data structure, and an instruction to add an additional relationship among the number of variables. The steps also include generating a modified prompt by adding the natural language constraint to the prompt. The steps also include executing the language model on the modified prompt to output an updated directed graph data structure. The method also includes determining that convergence occurs when the updated directed graph data structure outperforms the threshold number of the number of predetermined additional directed graph data structures. The method also includes returning the final directed graph data structure. The final directed graph data structure includes the updated directed graph data structure at a last step of the number of steps. The number of variables are sufficiently numerous that generation of the final directed graph data structure is computationally explosive.

Other aspects of one or more embodiments will be apparent from the following description and the appended claims.

BRIEF DESCRIPTION OF DRAWINGS

FIG. 4 shows an example of a causal graph data structure generated according to one or more embodiments.

Like elements in the various figures are denoted by like reference numerals for consistency.

DETAILED DESCRIPTION

Figure 1:
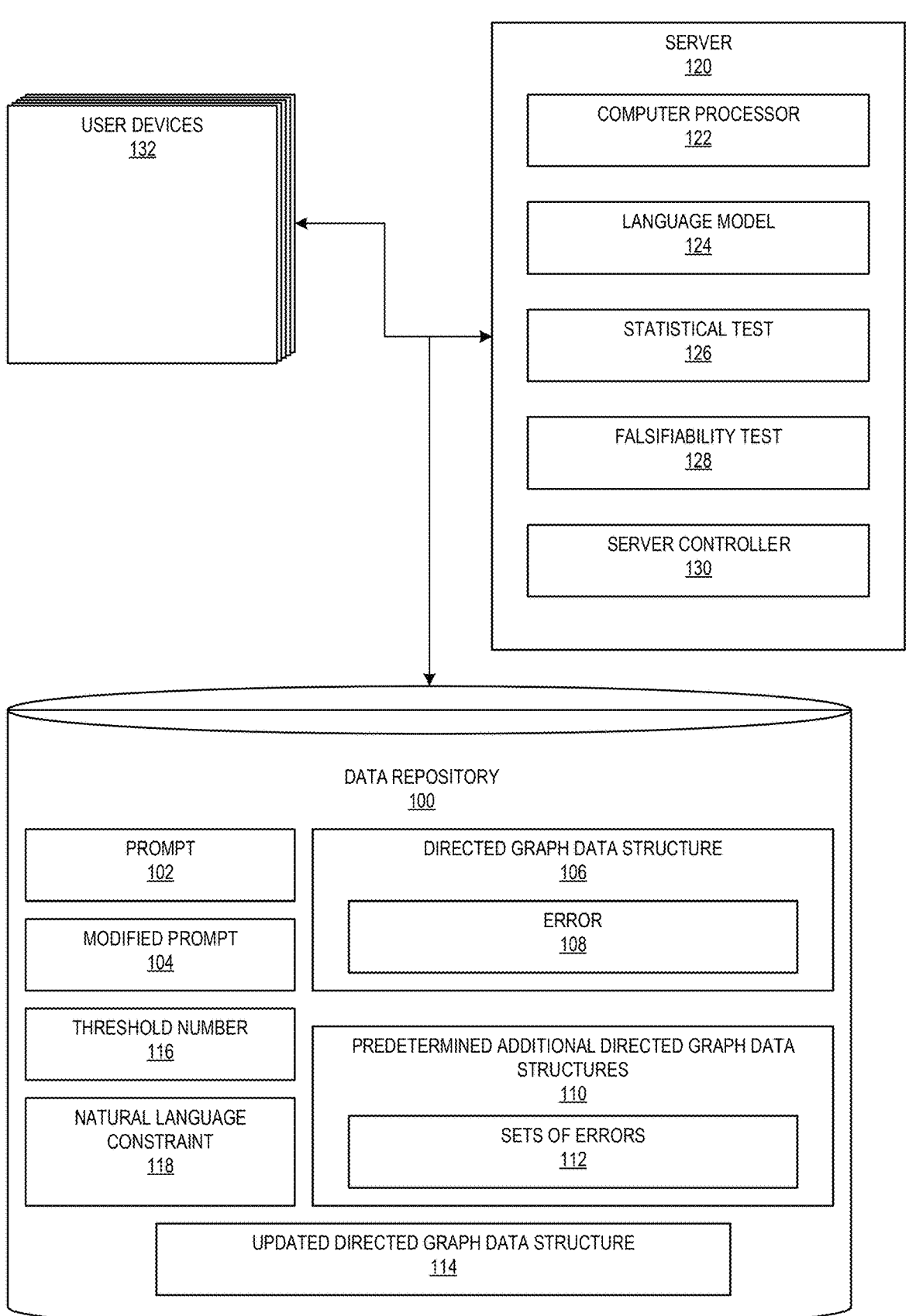
FIG. 1 shows a computing system for automated generation of valid, computationally explosive causal graph data structures, in accordance with one or more embodiments.

In general, embodiments of the invention relate to minimizing computationally explosive group generation in computer systems with limited computing resources. The term "computationally explosive" is defined as a sufficient number of computations that available physical computing system resources cannot perform a desired algorithm within a time limit predetermined to be acceptable, or cannot fully execute the algorithm due to insufficient computing resources.

In particular, the one or more embodiments are related to improving a computer's efficiency to generate a causal graph. Briefly, a causal graph is a graph expressed as nodes and edges, where the nodes indicate data points or objects (identified as variables) and the edges represent relationships between the variables. The edges indicate which variables are responsible for causing other variables in the causal graph. In a computing context, a causal graph may be represented by a data structure, such as but not limited to a directed acyclic graph (DAG) or other graph data structure.

Causal graphs may be extremely useful for a variety of purposes, depending on implementation, such as project management (understanding which interacting projects should receive the most limited resources to maximize project efficiency), computer network bandwidth allocation in a router, identifying causal relationships in complex biological or chemical environments for drug testing purposes, and many other applications.

Domain knowledge (e.g., human knowledge or knowledge stored in a data repository) is used in causal graph creation, as domain knowledge informs the identification and interpretation of variables. However, domain knowledge has limitations. Domain knowledge can introduce biases through subjective assumptions, may overlook unknown confounders, and may rely heavily on human expert intuition that might not capture all complexities present in real-world data.

The subjective biases will increase exponentially in a radical manner as the number of variables increases. For example, the number of possible causal graphs increases from 25 to 3.8 million as the number of variables increases from three to six. In other words, if there are three variables, then there are 25 possible arrangements of edges among the three variables. If there are six variables, then there are 3.8 million possible arrangements of edges among the three variables. As another example, FIG. 4 shows a simple example of a causal graph having nine variables. In a nine variable causal graph, the number of possible edge arrangements, and thus the number of possible causal graphs, increases to 1, 213, 442, 454, 842, 881, which is more than a quadrillion possible causal graphs. A quadrillion is one billion times one million. At 10 variables, the number of possible edge arrangements and the number of causal graphs increases to $4.2*10^{18}$, which is more than 4 quintillion possible causal graphs. A quintillion is one billion times one billion.

In some realistic environments, the number of variables in the causal graph may exceed 100 or more. Thus, the number of possible arrangements of nodes, and hence causal graphs, may be become inconceivably vast in number.

The technical problem with using a computer to automatically generate a causal graph is that each possible causal graph will be validated to ensure that a randomly generated causal graph is correct or at least passes a statistical validity test. However, even with the generation of a nine variable causal graph the number of computations may take an unacceptable amount of time to compute using a modern computer. A 12 variable causal graph that is proven to be accurate by computerized testing, much less a causal graph with 100 variables or more, simply cannot be generated by a computer. Modern computers, even at teraflops per second, cannot perform the calculations fast enough. For example, at 100 variables or more, a modern computer would require more time than the current age of the Universe (13.77 billion years) to identify a valid causal graph. Indeed, increasing the speed of modern computers by a factor of a million or more would be insufficient to solve such vast numbers of calculations within a human lifetime.

Nevertheless, the automated generation of valid causal graphs remains highly desirable. Thus, the technical problem becomes generating a software or hardware algorithm for reducing the number of calculations used to identify and validate a causal graph to within a number of calculations that a modern computer can perform in a matter of seconds to hours. One or more embodiments are directed to a technical solution to the above-identified technical problem.

The technical solution to the above-identified technical problem involves using a language model in the generation of a valid causal graph. In particular, the language model may take the variables and a prompt (a command) to output a proposed casual graph. The proposed causal graph is tested and the test result is compared to the test results of a number of randomly generated causal graphs. The number of randomly generated causal graphs is controlled to prevent a computationally explosive computer operation. The result of comparing the test results (of the error in the proposed causal graph and the randomly generated causal graphs) is a ratio.

The ratio indicates the performance of the proposed casual graphs relative to the set of randomly generated causal graphs.

If the proposed causal graph output by the language model fails to outperform a predetermined number of the randomly generated causal graphs (e.g., the proposed causal graph outperforms less than 99% of the randomly generated causal graphs), then a constraint generator modifies the initial prompt used to command the language model. The prompt is modified to instruct the language model to avoid certain erroneous relationships among the variables in the causal graph. In particular, empirical validation and statistical feedback are used to generate the modified prompt.

The process then repeats, but this time using the modified prompt to generate the proposed causal graph. Because the modified prompt is based on empirical validation and statistical feedback, each iteration of the process increases the accuracy and therefore performance of the proposed graph at next iteration. The process continues to repeat until a proposed causal graph is identified that outperforms the predetermined number of randomly generated causal graphs. The proposed causal graph is then returned as a final causal graph (e.g., stored in a data repository, passed to another computing process, displayed on a graphical user interface to a user for validation, etc.). Thus, the use of empirical validation through diverse practical scenarios, simulations, or experimental results in a robust, computationally efficient process for generating a causal graph in numerous different technical areas. Accordingly, one or more embodiments may provide a general solution to the computationally explosive problem of automatically generating a valid causal graph.

The technical solution identified above avoids the computationally explosive command of testing all possible causal graphs that could be identified for a given set of variables. In addition, because the process described above continues to further constrain the prompt to the language model from iteration to iteration, the process may quickly converge onto an automatically generated causal graph that is valid and that also outperforms a potentially large number of randomly generated causal graphs (e.g., thousands or millions). Accordingly, one or more embodiments may be used to automatically identify valid causal graphs even for a large number of variables (100 variables, 1,000 variables, or more) in a reasonable amount of time (seconds to hours) using a typical desktop computer. Therefore, one or more embodiments are directed to a technical solution for the technical problem of insufficient computing resources existing to generate a valid causal graph with a computationally explosive number of variables.

Attention is now turned to the figures. FIG. 1 shows a computing system for automated generation of valid, computationally explosive causal graph data structures, in accordance with one or more embodiments. The system shown in FIG. 1 includes a data repository (100). The data repository (100) is a type of storage unit or device (e.g., a file system, database, data structure, or any other storage mechanism) for storing data. The data repository (100) may include multiple different, potentially heterogeneous, storage units and/or devices.

The data repository (100) also may store a prompt (102). The prompt (102) is a command to a language model (124) (defined below). The prompt (102) may take the form of natural language text, but may also take the form of one or more vector data structures that store data (e.g., the variables and edges that may form a directed graph data structure (106)). The prompt (102) also may include constraints (e.g., the natural language constraint (118) defined below) that constrain the language model (124) to perform, or not perform, certain actions when generating an output. The constraint also may constrain the output itself, but permit the language model (124) to determine how to achieve the constrained output.

The data repository (100) also may store a modified prompt (104). The modified prompt (104) is a prompt that has been modified to include a new constraint, as defined above, during the method of FIG. 2 or the example method of FIG. 3. Generation of the modified prompt (104) is described with respect to FIG. 2.

The data repository (100) also may store a directed graph data structure (106). The directed graph data structure (106) is a computer readable data structure stored, or storable, on a non-transitory computer readable storage medium. In particular, the directed graph data structure (106) takes the form of a directed graph, such as but not limited to a directed acyclic graph, an undirected graph, a weighted graph, a bi-directional graph, a cycle graph, a Hamilton graph, and others. In particular embodiments (e.g., the directed acyclic graph shown in FIG. 4), the directed graph data structure (106) is a directed acyclic graph.

The directed graph data structure (106) may be associated with an error (108). The error (108) is a detected error in the directed graph data structure (106). The error (108) may be, for example, identification of an incorrect causal relationship between two variables in the directed graph data structure (106). The error (108) also may be a stored number that represents how many such errors exist for the directed graph data structure (106). The error (108) also may record information regarding the specific types of errors that exist with respect to the edge between any two variables. The error (108) may be stored in the data repository (100) as part of the directed graph data structure (106) (e.g., as a metadata tag associated with the directed graph data structure (106)), or may be stored in a separate data structure.

The data repository (100) also may store a number of predetermined additional directed graph data structures (110). The predetermined additional directed graph data structures (110) are graph data structures that represent possible causal graphs for the variables in questions. The predetermined additional directed graph data structures (110) may be generated as described with respect to FIG. 2. Briefly, the predetermined additional directed graph data structures (110) may be generated using a directed graph data structure generator, such as the language model (124) or some other algorithm to generate random possible sets of relationships among the variables. Use of the predetermined additional directed graph data structures (110) are described with respect to FIG. 2.

The predetermined additional directed graph data structures (110) each may include a set of errors. Thus, the predetermined additional directed graph data structures (110) include an equal number of sets of errors (112) (one set of errors per additional directed acyclic graph). Each of the sets of errors (112) is errors predetermined to apply to the predetermined additional directed graph data structures (110). Thus, in one or more embodiments, each of the predetermined additional directed graph data structures (110) has already been checked for errors using statistical tests, as described with respect to FIG. 2. Accordingly, the sets of errors (112) are known for each of the predetermined additional directed graph data structures (110). Note that the predetermined additional directed graph data structures (110) may be controlled to be fewer in number than a computationally explosive number of graph data structures.

Thus, determining the sets of errors (112) for the predetermined additional directed graph data structures (110) is not computationally explosive.

The data repository (100) also stores an updated directed graph data structure (114). The updated directed graph data structure (114) is a directed graph data structure (106) that is generated during the iterative process described with respect to FIG. 2. In particular, the updated directed graph data structure (114) is a graph data structure output by the language model (124) after at least one natural language constraint (118) has been added to the prompt (102). In other words, the updated directed graph data structure (114) is one graph data structure generated using a modified prompt (104).

Figure 2:
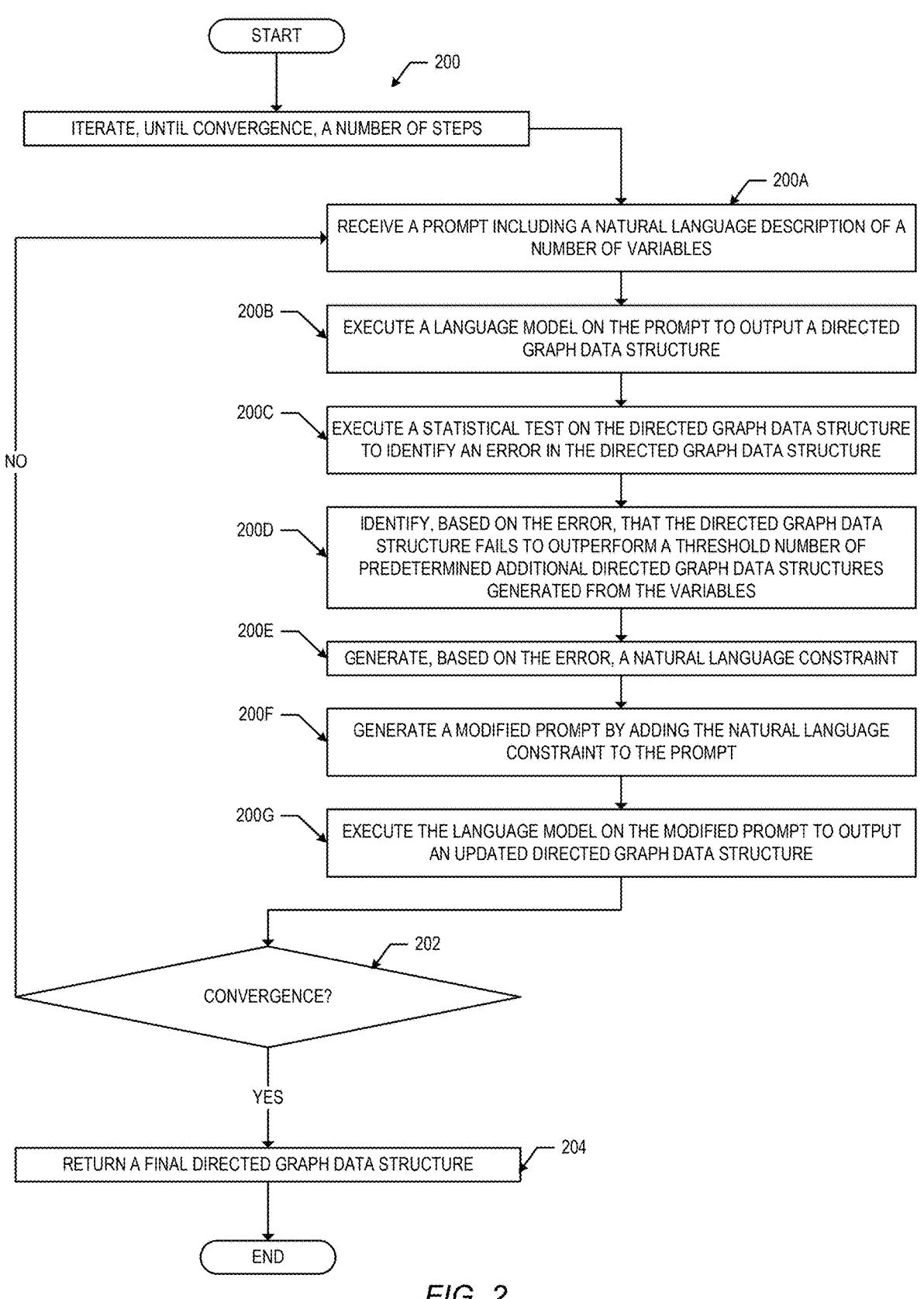
FIG. 2 shows a flowchart of a method for automated generation of valid, computationally explosive causal graph data structures, in accordance with one or more embodiments.

Eventually, upon convergence as described with respect to FIG. 2, the last updated directed graph data structure (114) generated during the method is referred to as a final directed graph data structure. The final directed graph data structure is the directed graph data structure that is returned.

The data repository (100) also stores a threshold number (116). The threshold number (116) is a predetermined percentage of the predetermined additional directed graph data structures (110). The percentage relates to the number of the predetermined additional directed graph data structures (110) that the directed graph data structure (106) or the updated directed graph data structure (114) will outperform before the method of FIG. 2 returns the final directed graph data structure.

A given directed graph data structure (106) or updated directed graph data structure (114) outperforms one of the predetermined additional directed graph data structures (110) when the error (108) (or the number of errors) identified in the directed graph data structure (106) or updated directed graph data structure (114) is less than the number of errors in the sets of errors (112) for a given one of the predetermined additional directed graph data structures (110). Thus, for example, if the updated directed graph data structure (114) includes ten errors, and one of the predetermined additional directed graph data structures (110) includes one error, then the updated directed graph data structure (114) does not outperform the predetermined additional directed graph data structures (110). However, if the updated directed graph data structure (114) includes ten errors, and one of the predetermined additional directed graph data structures (110) includes twelve errors, then the updated directed graph data structure (114) does outperform the predetermined additional directed graph data structures (110).

Thus, the threshold number (116) may represent the minimum number, or percentage, of the predetermined additional directed graph data structures (110) that the updated directed graph data structure (114) (or directed graph data structure (106)) will outperform before the final directed graph data structure is returned. For example, if the updated directed graph data structure (114) outperforms 98% of the predetermined additional directed graph data structures (110), but the threshold number (116) is 99%, then the updated directed graph data structure (114) is not returned as the final directed graph data structure. However, if the updated directed graph data structure (114) outperforms 99.5% of the predetermined additional directed graph data structures (110), and the threshold number (116) is 99%, then the updated directed graph data structure (114) is returned as the final directed graph data structure.

The data repository (100) also stores a natural language constraint (118). The natural language constraint (118) is natural language alphanumeric text that is added to the prompt (102) to generate the modified prompt (104), or is added to the modified prompt (104) to generate an updated version of the modified prompt (104) during the method of FIG. 2. The natural language constraint (118) defines, in words or numbers, a constraint that the language model (124) is to apply when generating the updated directed graph data structure (114). Use of the natural language constraint (118) is described with respect to FIG. 2.

The system shown in FIG. 1 may include other components. For example, the system shown in FIG. 1 also may include a server (120). The server (120) is one or more computer processors, data repositories, communication devices, and supporting hardware and software. The server (120) may be in a distributed computing environment. The server (120) is configured to execute one or more applications, such as the language model (124), the statistical test (126), the falsifiability test (128), and the server controller (130). An example of a computer system and network that may form the server (120) is described with respect to FIG. 5A and FIG. 5B.

The server (120) includes a computer processor (122). The computer processor (122) is one or more hardware or virtual processors which may execute computer readable program code that defines one or more applications, such as the language model (124), the statistical test (126), the falsifiability test (128), and the server controller (130). An example of the computer processor (122) is described with respect to the computer processor(s) (502) of FIG. 5A.

The server (120) also includes a language model (124). The language model (124) is a natural language processing machine learning model. An example of the language model (124) may be a large language model, such as CHATGPT® by OpenAI. However, different language models may be used. In general, however, the language model (124) processes natural language text to generate an output defined by the prompt (102). The language model may include a neural network, an attention head, and possibly other components. Use of the language model (124) is described with respect to FIG. 2.

The server (120) also stores a statistical test (126). The statistical test (126) is a computer executable problem that performs one or more statistical procedures on one or more aspects of the directed graph data structure (106) or the updated directed graph data structure (114). For example, the statistical test (126) may test whether a particular edge between to variables in the directed graph data structure (106) accurately reflects a causal relationship. An example of the statistical test (126) may be a program that executes a conditional independence test between the variables in the directed graph data structure (106) or the updated directed graph data structure (114). Other examples of the statistical test (126) may be programs that execute one or more of regression tests, comparison tests, correlation tests, counterfactual analysis, hypothesis tests, etc.

The server (120) also stores a falsifiability test (128). The falsifiability test (128) is a computer executable program that performs one or more falsifiability tests on one or more aspects of the directed graph data structure (106) or the updated directed graph data structure (114). The falsifiability test (128) may be a computer program that implements a falsification test for IV assumptions, a baseline derivation test, a local Markov condition test, or other tests.

The falsifiability test (128) determines whether a fatal error exists in the directed graph data structure (106) or the updated directed graph data structure (114). A fatal error is a type of error (108) which, due to its presence, invalidates the directed graph data structure (106) or the updated directed graph data structure (114). If the directed graph data structure (106) or the updated directed graph data structure (114) is invalid, then the directed graph data structure (106) or the updated directed graph data structure (114) will not be used. An example of a fatal error is an error that either cannot be corrected or requires too many (i.e., more than a predetermined number) changes to the directed graph data structure (106) or the updated directed graph data structure (114) to correct. For example, a fatal error could be that the starting node in the directed graph data structure (106) or the updated directed graph data structure (114) is actually an end node of the directed graph data structure (106) or the updated directed graph data structure (114).

The server (120) also may include a server controller (130). The server controller (130) is software or application specific hardware which, when executed by the computer processor (122), controls and coordinates operation of the software or application specific hardware described herein. The server controller (130) may be used to execute the method of FIG. 2. The server controller (130) also may control and coordinate execution of the language model (124), the statistical test (126), and the falsifiability test (128).

The system shown in FIG. 1 also may include one or more user devices (132). The user devices (132) are computing systems (e.g., the computing system (500) shown in FIG. 5A) that communicate with the server (120).

The user devices (132) may be considered remote or local. A remote user device is a device operated by a third-party (e.g., an end user of a chatbot) that does not control or operate the system of FIG. 1. Similarly, the organization that controls the other elements of the system of FIG. 1 may not control or operate the remote user device. Thus, a remote user device may not be considered part of the system of FIG. 1.

In contrast, a local user device is a device operated under the control of the organization that controls the other components of the system of FIG. 1. Thus, a local user device may be considered part of the system of FIG. 1.

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for automated generation of valid, computationally explosive causal graph data structures, in accordance with one or more embodiments. The method of FIG. 2 may be implemented using the system of FIG. 1 and one or more of the steps may be performed on or received at one or more computer processors. The method of FIG. 2 may be characterized as a method of enhancing a computational efficiency of a computer.

Step 200 includes iterating, until convergence, a number of steps. In other words, step 200 is the iteration of the sub-steps 200A through 200G, until convergence occurs.

Sub-step 200A includes receiving a prompt including a natural language description of a number of variables. The prompt may be received from a user or from an automated process. The prompt also includes a command to generate a causal graph from the variables. The number of variables are sufficiently numerous that generation of a final directed graph data structure from the number of variables is computationally explosive.

Sub-step 200B includes executing a language model on the prompt to output a directed graph data structure. Thus, the input to the language model is the prompt and the variables. The input to the prompt also may include a vector that defines the variable and a natural language command to generate a causal graph from the variables in the vector. The output of the language model is a proposed causal graph in the form of a directed graph data structure.

In an embodiment, at sub-step 200B, the number of variables in the prompt (or in a vector referred to by the prompt) may include a number of relationships among the number of variables. In this case, the prompt may further include a command to generate the directed graph data structure based on the number of relationships.

Sub-step 200C includes executing a statistical test on the directed graph data structure to identify an error in the directed graph data structure. The statistical test is a computer program that executes a statistical procedure on the directed graph data structure. Thus, the input to the statistical test is the directed graph data structure, and the output is a determination of whether one or more errors exist in the directed graph data structure. Again, the errors relate to the causal relationships defined by the edges between the nodes (i.e., the variables), where the language model proposed the edges.

Sub-step 200D includes identifying, based on the error, that the directed graph data structure fails to outperform a threshold number of a number of predetermined additional directed graph data structures generated from the number of variables. The performance comparison at sub-step 200D is executed by comparing the number of errors identified in the directed graph data structure as determined at sub-step 200C to the number of errors present in each of a set of preexisting directed graph data structures. The errors in the preexisting directed graph data structures were already previously known or determined. The directed graph data structure fails to outperform one of the preexisting directed graph data structures when the directed graph data structure has more errors or the same number of errors as the currently compared preexisting directed graph data structure.

Thus, the directed graph data structure output at sub-step 200B fails to outperform the threshold number of predetermined directed graph data structures when the current directed graph data structure has fewer errors than a predetermined threshold number of the preexisting directed graph data structures. The threshold number represents a predetermined percentage of a total number of the number of predetermined additional directed graph data structures.

As an example, assume the threshold is 99%. The current directed graph data structure fails at sub-step 200D when the current directed graph data structure has fewer errors than 98.9% of the preexisting directed graph data structures. The current directed graph data structure would pass at sub-step 200D (thereby implicating convergence at step 202) when the current directed graph data structure has fewer errors than 99% or more of the preexisting directed graph data structures.

Note that the threshold may vary (i.e., may be greater than or less than 99%). The threshold itself may be determined by a computer scientist or by an automated process (e.g., by a computer program or machine learning model designed to predict an acceptable threshold). The threshold may depend on the number of available tested preexisting directed graph data structures.

Thus, sub-step 200D may include comparing the error in the directed graph data structure to a number of sets of errors present in the predetermined additional directed graph data structures. Each one of the number of sets of errors corresponds to one of the predetermined additional directed graph data structures. Likewise, determining that the directed graph data structure outperforms a selected predetermined additional directed graph data structure in the predetermined additional directed graph data structures when the error includes fewer errors than a selected set of errors in a corresponding one of the number of sets of errors. Stated differently, when determining that convergence occurs, the term outperforms means that fewer errors resulted from the statistical test relative to errors present in any of the threshold number of the number of predetermined additional directed graph data structures.

Sub-step 200D also may include comparing the error in the directed graph data structure to a number of sets of errors present in the predetermined additional directed graph data structures. Each one of the number of sets of errors corresponds to one of the predetermined additional directed graph data structures. In this case, determining that the directed graph data structure outperforms a selected predetermined additional directed graph data structure in the predetermined additional directed graph data structures when the error includes a severity less than a selected severity of error in a corresponding one of the number of sets of errors. The severity of the error may be determined according to a predetermined type of error (e.g., a table that associates types of error with a corresponding severity or an evaluation by the language model regarding how severe the error is).

Sub-step 200E includes generating, based on the error, a natural language constraint. The constraint describes, in words or numbers, how the language model will be constrained on the next iteration of step 200. For example, the constraint may instruct the language model to avoid certain relationships among the variables, the constraint may instruct the language model to favor certain relationships among the variables, the constraint may identify two variables as being required to be related (or unrelated), whether directly or indirectly. Other constraints may be used.

Figure 3:
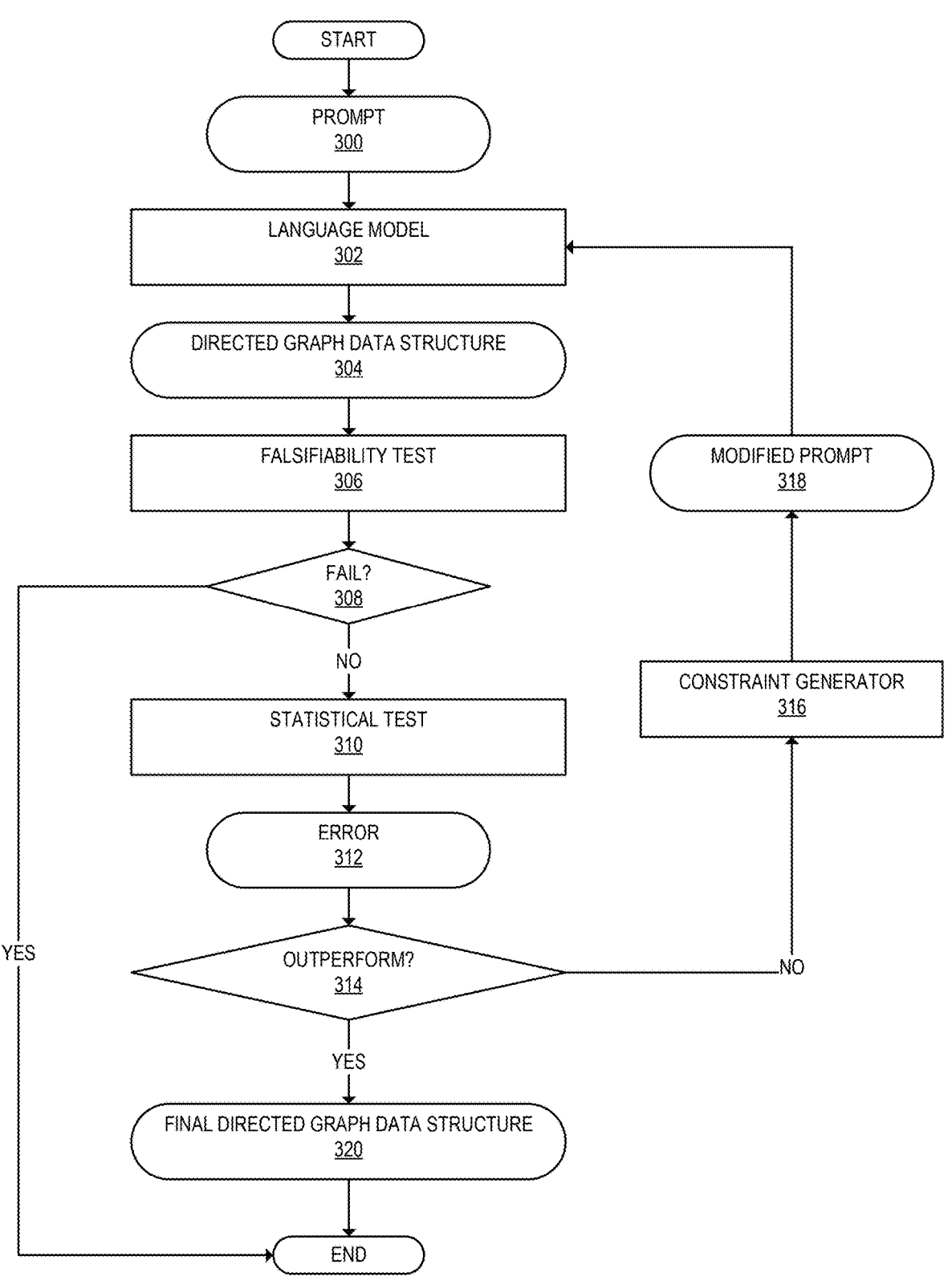
FIG. 3 shows an example of automated generation of valid, computationally explosive causal graph data structures, in accordance with one or more embodiments.

The constraints may be determined by a constraint controller (see FIG. 3). The constraint controller may take, as input, the directed graph data structure, the error, or a combination thereof, and output the constraint. The constraint controller may be the language model that was used to generate the directed graph data structure. The constraint controller may be some other language model or other machine learning model. The constraint controller may be programmed to generate the constraint, as described above, in a manner that is predicted to reduce the error rate of the next directed graph data structure generated at the next iteration of step 200.

Thus, for example, the constraint may include one or more of the following. The constraint may be an instruction to avoid a causal relationship in the directed graph data structure that failed the statistical test. The constraint may be an instruction to reject the directed graph data structure. The constraint may be an instruction to add an additional relationship among the variables. Other variations are possible.

Sub-step 200F includes generating a modified prompt by adding the natural language constraint to the prompt. The natural language constraint may be added to the prompt by appending the natural language constraint to a previous prompt used during the iteration of step 200. A server controller, or the language model, may modify the prompt to generate the modified prompt.

Sub-step 200G includes executing the language model on the modified prompt to output an updated directed graph data structure. Sub-step 200G is similar to sub-step 200B, except now the language model is commanded, using the modified prompt, to generate a new causal graph from among the same set of variables.

Step 202 includes determining that convergence occurs when the updated directed graph data structure outperforms the threshold number of the number of predetermined additional directed graph data structures. Thus, if at sub-step 200D, the directed graph data structure outperforms the threshold number of predetermined additional directed graph data structures, then the remaining sub-step of step 200 will be performed for that iteration. However, after sub-step 200G being subsequently performed, convergence is determined (i.e., a "yes" determination at step 202). In this case, the method proceeds to step 204.

Otherwise, (i.e., step 200D identifies failure of the directed graph data structure to outperform) after sub-step 200G the convergence is determined not to have occurred (i.e., a "no" determination at step 202). In this case, the method proceeds to sub-step 200A and step 200 iterates.

Step 204 includes returning the final directed graph data structure. The final directed graph data structure includes the updated directed graph data structure at the last iteration of the sub-steps. The directed graph data structure may be returned by storing the directed graph data structure, transmitting the final directed graph data structure to another computer process that will use the final directed graph data structure as input (i.e., will execute on the final directed graph data structure), by displaying the final directed graph data structure on a graphical user interface, or otherwise process the final directed graph data structure.

In the case of displaying the final directed graph data structure, a computer scientist or technician may review the directed graph data structure to determine if the directed graph data structure should be modified or rejected. If the directed graph data structure is subsequently rejected, the method of FIG. 2 may be iterated again.

The method of FIG. 2 may be varied. For example, during the sub-steps performed at step 200, the sub-steps also may include executing, prior to executing the statistical test, a falsifiability test on the directed graph data structure to determine whether the directed graph data structure passes a baseline rule. If the falsifiability test indicates that the current directed graph data structure fails, then the process may terminate immediately. However, the process may begin again. Otherwise, the sub-step of executing the statistical test may be performed responsive to passing the baseline rule.

The baseline rule may be a rule or policy that the directed graph data structure pass a minimum standard. For example, if the directed graph data structure starts with an ending node, then the falsifiability test may be failed. In another example, the falsifiability test may be any of the tests described with respect to FIG. 1. Likewise, if the directed graph data structure fails such a falsifiability test, then the method terminates prematurely; otherwise, the method proceeds as described above.

In an embodiment, the falsifiability test may be performed only once, immediately after executing the language model on the prompt for the first time at sub-step 200B. In subsequent iterations, the falsifiability test may be skipped.

In another embodiment, the method of FIG. 2 also may include, prior to iterating the sub-steps at step 200, generating the predetermined additional directed graph data structures. The predetermined additional directed graph data structures may be randomly generated. The language model, or some other machine learning model or automated process, may generate the predetermined additional directed graph data structures from the variables.

The predetermined additional directed graph data structures may be subjected to a falsifiability test. Any predetermined additional directed graph data structures that fail the falsifiability test may be discarded. Thus, only potentially valid directed graph data structures that are randomly generated are included in the predetermined additional directed graph data structures.

Additionally, the statistical test may be executed on the predetermined additional directed graph data structures. Each of the predetermined additional directed graph data structures may be associated with a set of errors that are identified by executing the statistical test on a given predetermined additional directed graph data structure. The set of errors may be used to compare a directed graph data structure generated at sub-step 200D.

While the various steps in the flowchart of FIG. 2 are presented and described sequentially, at least some of the steps may be executed in different orders, may be combined or omitted, and at least some of the steps may be executed in parallel. Furthermore, the steps may be performed actively or passively.

The method of FIG. 2 has practical applications. For example, the final graph data structure (i.e., the causal graph) may be integrated into existing predictive analytics and business intelligence platforms. Thus, one or more embodiments are easy to adopt and be used to improve the performance of other machine learning models or other business intelligence platforms or enterprise systems. For example, one or more embodiments provide the benefits of validating graphs against diverse datasets, scenarios, or experimental results. One of the benefits may be to reinforce robustness and practical applicability of existing intelligence platforms or enterprise systems. Another benefit may be that one or more embodiments may be applied to many different applications in data analytics, improved machine learning model performance, etc. For example, one or more machine learning models or ensembles of models may take as input the causal graph of one or more embodiments and thereby improve the accuracy of the predicted output of the model or models.

FIG. 3 shows an example of automated generation of valid, computationally explosive causal graph data structures, in accordance with one or more embodiments. FIG. 3 shows both components and steps, and thus may be characterized as a workflow.

Initially, a prompt (300) is submitted as input to a language model (302). The language model (302) is executed and generates, as output, a directed graph data structure (304). The directed graph data structure (304) is provided as input to a falsifiability test (306). The falsifiability test (306) determines whether the directed graph data structure (304) passes a baseline rule.

Then, a fail determination (308) is performed. If the falsifiability test (306) outputs an indication of fail (a "yes" determination at fail determination (308)), then the workflow terminates immediately. The process may be restarted, at least one embodiment includes establishing a minimally acceptable initial directed graph data structure, as determined by the falsifiability test (306).

If the falsifiability test (306) outputs an indication of pass (i.e., a "no" determination at fail determination (308)), then the directed graph data structure (304) is provided as input to a statistical test (310). The statistical test (310) executes on the directed graph data structure (304). The output of the statistical test (310) is an error (312) (which may be two or more errors in some embodiments).

In an embodiment, the statistical test (310) may indicate no errors. In such an event, the process may terminate immediately and the current directed graph data structure (304) may be output as the final directed graph data structure (320).

Then, an outperform determination (314) is performed. At the outperform determination (314), a server controller determines whether the current version of the directed graph data structure (304) outperforms more than a threshold number of predetermined additional directed graph data structures. The determination is performed as described with respect to FIG. 2. However, briefly, if the current version of the directed graph data structure (304) has fewer errors than (or has fewer error types than) a threshold percentage of a set of predetermined additional directed graph data structures, then the outperform determination (314) is affirmative (i.e., a "yes" determination at the outperform determination (314)). Otherwise, the outperform determination (314) is negative (i.e., a "no" determination at the outperform determination (314)).

In an embodiment, for the initial directed graph data structure (304), the outperform determination (314) is negative. In other words, the initial directed graph data structure (304) has more errors (or more error types) than the threshold percentage of predetermined additional directed graph data structures. Then, a constraint generator (316) generates a natural language constraint, as described with respect to FIG. 2.

The natural language constraint is added to the prompt (300) to generate a modified prompt (318). The modified prompt (318) is then provided as input to the language model (302) to generate an updated directed graph data structure. In other words, after generation of the modified prompt (318), the directed graph data structure (304) becomes an updated directed graph data structure. The workflow then continues until the outperform determination (314) is reached again. The workflow continues to iterate so long as the outperform determination (314) is negative.

However, once the outperform determination (314) is positive, then the current version of the directed graph data structure (304) is returned as the final directed graph data structure (320). In an embodiment, the workflow of FIG. 3 may terminate thereafter.

The method of FIG. 2 or the workflow of FIG. 4 reduces the number of calculations that are performed to automatically generate a valid causal graph. Specifically, by generating a relatively large, but controllable, number of predetermined additional directed graph data structures, the number of possible directed graph data structures may be controlled to a number that is well within the available computing resource limitations. Furthermore, by performing the iterative process described with respect to FIG. 2 and FIG. 3, the language model becomes increasingly better at predicting a valid causal graph by the iteratively increasing number of constraints that are added to the modified prompt. Thus, the language model quickly converges on a causal graph that is either fully correct, or that is more correct than the threshold percentage of predetermined additional directed graph data structures. Any remaining errors in the final directed graph data structure may be quickly reviewed and corrected.

In any case, the technical solutions represented in FIG. 2 and FIG. 3 permit the automated generation of a valid causal graph using vastly fewer computational resources, relative to commanding a language model (or some other application) to generate one by generating and checking the possible combinations one by one. Indeed, by controlling the number of predetermined additional directed graph data structures generated, and by using the iterative process that continues to add constraints to the updated prompt, the processes described herein may be tailored to match the specific amount of processing resources that are available to generate a final directed graph data structure.

FIG. 4 shows an example of a causal graph data structure generated according to the method of FIG. 3, in accordance with one or more embodiments. The following example is for explanatory purposes only and not intended to limit the scope of one or more embodiments.

The causal graph (400) shown in FIG. 4 has nine nodes. Thus, generating a valid causal graph from the nine nodes, by randomly generating and testing causal graphs, would require generating and testing more than 121 trillion possible arrangements of edges and thus generating and testing a like number of possible causal graphs. Such a large number of calculations cannot be performed in an allotted amount of time, because insufficient computing resources are available. However, the causal graph (400) may be generated using the method of FIG. 2 or FIG. 4 in a relatively short amount of time because far fewer calculations are performed. Fewer calculations are performed because the number of predetermined additional directed graph data structures may be controlled, and because the iteratively updated prompt adds additional constraints to help the language model converge on a valid, or near valid, causal graph.

The causal graph (400) includes a number of nodes, such as node (402). Each node is one of the variables in the initial dataset. The initial dataset represents a project workflow. For example, the node (402) is entitled "contact_handled," meaning that the step in the workflow is that a contact has been handled appropriately for the particular workflow. Note that the size and color of the workflows may indicate additional information. The size of the nodes may indicate the number of paths entering or exiting a node. The color of the nodes may indicate a phase of the project. Other information may be represented in the causal graph (400).

The arrows in the causal graph (400), such as arrow (404), indicate the edges in the causal graph (400). Again, the edge indicates a causal relationship between the nodes, and thus represent causal relationships between the variables. Thus, for example, the arrow (404) represents a relationship between the node (402) ("Contact_Handeled") and the node (406) ("Resolution"). In other words, there is a causal relationship between the contact being handled (the variable indicated by the node (402)) and the matter being resolved (the variable indicated by the node (406)).

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figure 5A:
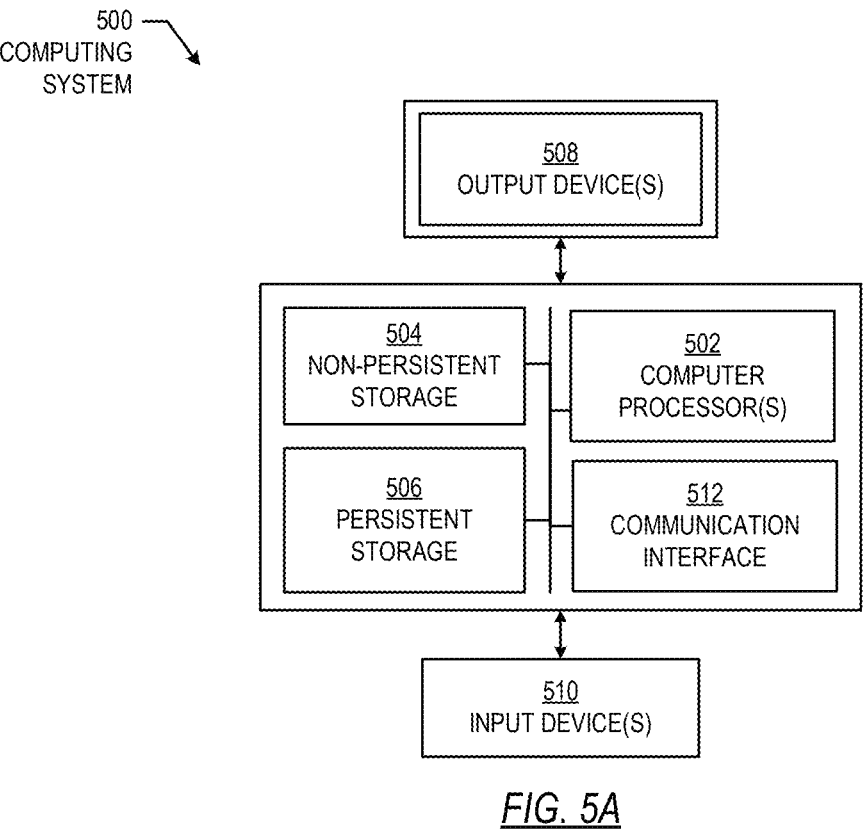
FIG. 5A and FIG. 5B show a computing system and network environment, in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or microcores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN), such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a nontransitory computer readable medium, such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

Figure 5B:
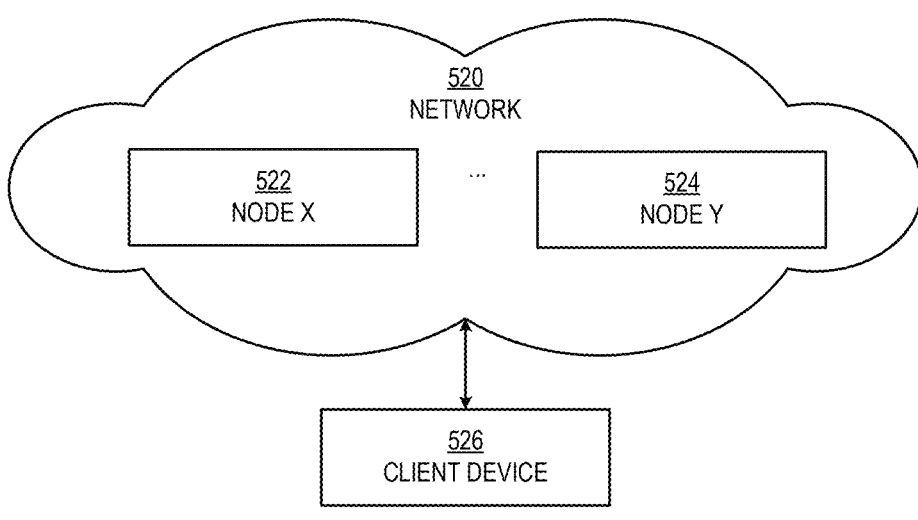

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof), such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method of enhancing a computational efficiency of a computer, the method comprising:
iterating, until convergence, a plurality of steps comprising:
receiving a prompt comprising a natural language description of a plurality of variables, wherein the plurality of variables are sufficiently numerous that generation of a final directed graph data structure from the plurality of variables is computationally explosive;
executing a language model on the prompt to output a directed graph data structure;
executing a statistical test on the directed graph data structure to identify an error in the directed graph data structure;
identifying, based on the error, that the directed graph data structure fails to outperform a threshold number of a plurality of predetermined additional directed graph data structures generated from the plurality of variables;
generating, based on the error, a natural language constraint;
generating a modified prompt by adding the natural language constraint to the prompt; and
executing the language model on the modified prompt to output an updated directed graph data structure;
determining that convergence occurs when the updated directed graph data structure outperforms the threshold number of the plurality of predetermined additional directed graph data structures; and
returning the final directed graph data structure, wherein the final directed graph data structure comprises the updated directed graph data structure at a last step of the plurality of steps.

2. The method of claim 1, further comprising, while iterating:
executing, prior to executing the statistical test, a falsifiability test on the directed graph data structure to determine whether the directed graph data structure passes a baseline rule; and
executing the statistical test responsive to passing the baseline rule.

3. The method of claim 1, wherein:
the plurality of variables comprise a plurality of relationships among the plurality of variables, and
the prompt further comprises a command to generate the directed graph data structure based on the plurality of relationships.

4. The method of claim 1, wherein the directed graph data structure and the updated directed graph data structure comprise directed acyclic graphs stored on a non-transitory computer readable storage medium.

5. The method of claim 1, wherein the directed graph data structure and the updated directed graph data structure comprise causal graphs stored on a non-transitory computer readable storage medium.

6. The method of claim 1, further comprising:
generating, prior to iterating, the predetermined additional directed graph data structures.

7. The method of claim 6, wherein the predetermined additional directed graph data structures are randomly generated.

8. The method of claim 1, wherein identifying comprises:
comparing the error in the directed graph data structure to
a plurality of sets of errors present in the predetermined
additional directed graph data structures, wherein each
one of the plurality of sets of errors corresponds to one
of the predetermined additional directed graph data
structures; and
determining that the directed graph data structure outper-
forms a selected predetermined additional directed
graph data structure in the predetermined additional
directed graph data structures when the error comprises
fewer errors than a selected set of errors in a corre-
sponding one of the plurality of sets of errors.

9. The method of claim 1, wherein identifying comprises:
comparing the error in the directed graph data structure to
a plurality of sets of errors present in the predetermined
additional directed graph data structures, wherein each
one of the plurality of sets of errors corresponds to one
of the predetermined additional directed graph data
structures; and
determining that the directed graph data structure outper-
forms a selected predetermined additional directed
graph data structure in the predetermined additional
directed graph data structures when the error comprises
a severity less than a selected severity of error in a
corresponding one of the plurality of sets of errors.

10. The method of claim 1, wherein generating the natural
language constraint comprises at least one of generating:
an instruction to avoid a causal relationship in the directed
graph data structure that failed the statistical test,
an instruction to reject the directed graph data structure,
and
an instruction to add an additional relationship among the
plurality of variables.

11. The method of claim 1, wherein the threshold number
comprises a percentage of a total number of the plurality of
predetermined additional directed graph data structures.

12. The method of claim 1, wherein, when determining
that convergence occurs, outperforms comprises fewer
errors resulting from the statistical test relative to errors
present in any of the threshold number of the plurality of
predetermined additional directed graph data structures.

13. The method of claim 1, wherein returning comprises
at least one of:
storing the final directed graph data structure in a non-
transitory computer readable storage medium,
presenting the final directed graph data structure on a
graphical user interface, and
passing the final directed graph data structure to a com-
puter process for further execution.

14. A system for enhancing a computational efficiency of
a computer, the system comprising:
a computer processor;
a data repository in communication with the computer
processor and storing:
a prompt comprising a natural language description of
a plurality of variables, wherein the plurality of
variables are sufficiently numerous that generation of
a final directed graph data structure from the plural-
ity of variables is computationally explosive,
a directed graph data structure,
an error in the directed graph data structure,
a plurality of predetermined additional directed graph
data structures,
a threshold number,
a natural language constraint,
a modified prompt, and an updated directed graph data structure, including the
final directed graph data structure;
a language model comprising a neural network executable
by the processor to:
receive the prompt,
output the directed graph data structure,
receive the updated prompt, and
output the updated directed graph data structure;
a statistical test executable by the processor to:
identify the error in the directed graph data structure;
a server controller executable by the processor to:
iterate, until convergence, a plurality of steps compris-
ing:
receiving the prompt,
executing the language model on the prompt to
output the directed graph data structure,
executing the statistical test on the directed graph
data structure to identify the error,
identifying, based on the error, that the directed
graph data structure fails to outperform the thresh-
old number of the plurality of predetermined addi-
tional directed graph data structures,
generating, based on the error, the natural language
constraint,
generating the modified prompt by adding the natu-
ral language constraint to the prompt, and
executing the language model on the modified
prompt to output the updated directed graph data
structure;
determine that convergence occurs when the updated
directed graph data structure outperforms the thresh-
old number of the plurality of predetermined addi-
tional directed graph data structures; and
returning the final directed graph data structure,
wherein the final directed graph data structure com-
prises the updated directed graph data structure at a
last step of the plurality of steps.

15. The system of claim 14, further comprising:
a falsifiability test executable on the directed graph data
structure prior to executing the statistical test to deter-
mine whether the directed graph data structure passes a
baseline rule; and
executing the statistical test responsive to passing the
baseline rule.

16. The system of claim 14, wherein:
the plurality of variables comprise a plurality of relation-
ships among the plurality of variables, and
the prompt further comprises a command to generate the
directed graph data structure based on the plurality of
relationships.

17. The system of claim 14, further comprising:
a directed graph data structure generator programmed to
generate the plurality of predetermined additional
directed graph data structures.

18. The system of claim 14, wherein the server controller
is executable to generate the natural language constraint by
generating at least one of:
an instruction to avoid a causal relationship in the directed
graph data structure that failed the statistical test,
an instruction to reject the directed graph data structure,
and
an instruction to add an additional relationship among the
plurality of variables.

19. The system of claim 14, wherein:
the directed graph data structure and the updated directed
graph data structure comprise directed acyclic graphs,
or the directed graph data structure and the updated directed graph data structure comprise causal graphs.

20. A method for enhancing a computational efficiency of a computer, the method comprising:

iterating, until convergence, a plurality of steps comprising:

receiving a prompt comprising a natural language description of a plurality of variables, wherein the plurality of variables are sufficiently numerous that generation of a final directed graph data structure from the plurality of variables is computationally explosive;

executing a language model on the prompt to output a directed graph data structure;

executing a falsifiability test on the directed graph data structure to determine whether the directed graph data structure passes a baseline rule;

executing, responsive to the falsifiability test passing the baseline rule, a statistical test on the directed graph data structure to identify an error in the directed graph data structure;

identifying, based on the error, that the directed graph data structure fails to outperform a threshold number of a plurality of predetermined additional directed graph data structures generated from the plurality of variables, wherein identifying comprises:

comparing the error in the directed graph data structure to a plurality of sets of errors present in the predetermined additional directed graph data structures, wherein each one of the plurality of sets of errors corresponds to one of the predetermined additional directed graph data structures, and determining that the directed graph data structure outperforms a selected predetermined additional directed graph data structure in the predetermined additional directed graph data structures when the error comprises fewer errors than a selected set of errors in a corresponding one of the plurality of sets of errors;

generating, based on the error, a natural language constraint, wherein the natural language constraint comprises at least one of:

an instruction to avoid a causal relationship in the directed graph data structure that failed the statistical test, an instruction to reject the directed graph data structure, and an instruction to add an additional relationship among the plurality of variables;

generating a modified prompt by adding the natural language constraint to the prompt; and executing the language model on the modified prompt to output an updated directed graph data structure;

determining that convergence occurs when the updated directed graph data structure outperforms the threshold number of the plurality of predetermined additional directed graph data structures; and returning the final directed graph data structure, wherein:

the final directed graph data structure comprises the updated directed graph data structure at a last step of the plurality of steps, and the plurality of variables are sufficiently numerous that generation of the final directed graph data structure is computationally explosive.

\* \* \* \* \*